(12) United States Patent
Wang et al.

(10) Patent No.: US 10,329,986 B2
(45) Date of Patent: Jun. 25, 2019

(54) MODEL-BASED MONITORING FOR SELECTIVE CATALYTIC REDUCTION DEVICE IN AFTERTREATMENT ASSEMBLY

(71) Applicant: GM GLOBAL TECHNOLOGY OPERATIONS LLC, Detroit, MI (US)

(72) Inventors: Yue-Yun Wang, Troy, MI (US); Yongjie Zhu, Troy, MI (US); Alessia Tuninetti, Piemonte (IT)

(73) Assignee: GM Global Technology Operations LLC., Detroit, MI (US)

( * ) Notice: Subject to any disclaimer, the term of this patent is extended or adjusted under 35 U.S.C. 154(b) by 132 days.

(21) Appl. No.: 15/653,031

(22) Filed: Jul. 18, 2017

(65) Prior Publication Data

US 2019/0024563 A1    Jan. 24, 2019

(51) Int. Cl.
*F02D 41/02*   (2006.01)
*F01N 3/20*   (2006.01)
(Continued)

(52) U.S. Cl.
CPC .......... *F01N 11/00* (2013.01); *B01D 53/9418* (2013.01); *B01D 53/9495* (2013.01); *F01N 3/208* (2013.01); *F01N 9/00* (2013.01); *F01N 2550/02* (2013.01); *F01N 2610/02* (2013.01); *F01N 2900/04* (2013.01); *F01N 2900/0418* (2013.01); *F01N 2900/0601* (2013.01); *F01N 2900/1402* (2013.01); *F01N 2900/1806* (2013.01); *F02D 41/0235* (2013.01); *F02D 41/1406* (2013.01); *F02D 2041/1412* (2013.01); *F02D 2041/1433* (2013.01); *F02D 2250/36* (2013.01)

(58) Field of Classification Search
CPC .... Y02T 10/24; F01N 11/00; F01N 2560/026; F01N 3/2066; F01N 2550/00; F01N 2900/0406; F01N 9/005; G01M 15/102
See application file for complete search history.

(56) References Cited

U.S. PATENT DOCUMENTS

8,201,444 B2    6/2012  Wang et al.
9,091,194 B2 *  7/2015  Ardanese ................ F01N 9/007
(Continued)

*Primary Examiner* — Audrey K Bradley
*Assistant Examiner* — Anthony Ayala Delgado
(74) *Attorney, Agent, or Firm* — Quinn IP Law (57) ABSTRACT

An aftertreatment assembly includes a selective catalytic reduction (SCR) device having a catalyst and configured to receive an exhaust gas. A controller is operatively connected to the SCR device. The controller having a processor and a tangible, non-transitory memory on which is recorded instructions for executing a method of model-based monitoring of the SCR device. The method relies on a physics-based model that may be implemented in a variety of forms. The controller is configured to obtain at least one estimated parameter, and at least one threshold parameter based at least partially on a catalyst degradation model. The catalyst degradation model is based at least partially on a predetermined threshold storage capacity ($\Theta_T$). A catalyst status is determined based on a comparison of the estimated and threshold parameters. The operation of the assembly is controlled based at least partially on the catalyst status.

20 Claims, 3 Drawing Sheets

(51) Int. Cl.
*F01N 11/00* (2006.01)
*B01D 53/94* (2006.01)
*F01N 9/00* (2006.01)
*F02D 41/14* (2006.01)

(56) References Cited

U.S. PATENT DOCUMENTS

| | | | | |
|---|---|---|---|---|
| 2011/0262329 | A1* | 10/2011 | Ofoli | B01D 53/90 |
| | | | | 423/213.2 |
| 2014/0182270 | A1* | 7/2014 | Jun | F01N 9/00 |
| | | | | 60/274 |
| 2015/0139860 | A1* | 5/2015 | Devarakonda | F01N 3/101 |
| | | | | 422/119 |
| 2017/0350291 | A1* | 12/2017 | Khaled | F01N 3/2066 |

* cited by examiner

MODEL-BASED MONITORING FOR SELECTIVE CATALYTIC REDUCTION DEVICE IN AFTERTREATMENT ASSEMBLY

INTRODUCTION

The disclosure relates generally to control of operation of an aftertreatment assembly, and more particularly, to model-based monitoring of a selective catalytic reduction (SCR) device in an aftertreatment assembly. Oxides of nitrogen, referred to herein as NOx, are a by-product of the combustion process. The oxides of nitrogen are created by the disassociation of nitrogen and oxygen molecules in the high temperatures of a combustion chamber. Many devices employ aftertreatment devices, such as selective catalytic reduction (SCR) devices, to convert the oxides of nitrogen to other constituents, in the presence of a catalyst. The efficiency of the aftertreatment device may decline after a period of use.

SUMMARY

An aftertreatment assembly includes a selective catalytic reduction (SCR) device having a catalyst and configured to receive an exhaust gas. A controller is operatively connected to the SCR device. The controller having a processor and a tangible, non-transitory memory on which is recorded instructions for executing a method of model-based monitoring of the SCR device. The method relies on a physics-based model that may be implemented in a variety of forms. Execution of the instructions by the processor causes the controller: to obtain at least one estimated parameter, including obtaining an estimated nitrogen oxide (NOx) concentration in the exhaust gas exiting the SCR device.

The controller is configured to obtain at least one threshold parameter based at least partially on a catalyst degradation model, including obtaining a threshold NOx concentration ($y_T$) in the exhaust gas exiting the SCR device. The catalyst degradation model is based at least partially on a predetermined threshold storage capacity ($\Theta_T$). A catalyst status is determined based on a comparison of the estimated parameter and the threshold parameter, via the controller. The operation of the assembly is controlled based at least partially on the catalyst status.

The catalyst degradation model is based at least partially on an inlet NOx concentration ($u_1$) in the exhaust gas entering the SCR device, an inlet dose ($u_2$) injected by the reductant injector, a plurality of predetermined parameters ($r_R$, $r_O$, $r_D$, $r_A$, $M_{WNH3}$ and $M_{WNOx}$), a flow rate (F) of the exhaust gas received at the SCR device and a volume (V) and temperature (T) of the SCR device. The catalyst degradation model is based at least partially on respective rates of change over time (t) of an outlet NOx concentration ($y_1$) of the exhaust gas exiting the SCR device, an ammonia coverage ratio ($\theta$), and an outlet ammonia concentration ($y_2$), respectively designated as $dy_1/dt$, $d\theta/dt$ and $dy_2/dt$, and calculated as:

$$\frac{dy_1}{dt} = \frac{1}{V}(Fu_1 - Fy_1 - r_R y_1 \Theta_T \theta)$$

$$\frac{d\theta}{dt} = \frac{r_A y_2}{F M_{WNH_3}}(1-\theta) - r_D \theta - \frac{r_R y_1}{F M_{WNO_x}}\theta - r_O \theta$$

$$\frac{dy_2}{dt} = \frac{1}{V}(Fu_2 - Fy_2 - r_A \Theta_T y_2(1-\theta) + r_D F M_{WNH_3} \Theta_T \theta)$$

In one embodiment, the catalyst degradation model is represented as:

$$0 = \frac{1}{V}(Fu_1 - Fy_1 - r_R y_1 \Theta_T \theta)$$

$$\frac{d\theta}{dt} = \frac{r_A y_2}{F M_{WNH_3}}(1-\theta) - r_D \theta - \frac{r_R y_1}{F M_{WNO_x}}\theta - r_O \theta$$

$$0 = \frac{1}{V}(Fu_2 - Fy_2 - r_A \Theta_T y_2(1-\theta) + r_D F M_{WNH_3} \Theta_T \theta)$$

Obtaining the estimated parameter includes: obtaining an estimated storage capacity ($\Theta$) of the catalyst based at least partially on an extended Kalman filter and a capacity aging model. The capacity aging model is based at least partially on a sample time (k), an outlet NOx concentration ($y_1$) of the exhaust gas exiting the SCR device, an outlet ammonia concentration ($y_2$), an inlet NOx concentration ($u_1$) of the exhaust gas entering the SCR device, an inlet dose ($u_2$) injected by the reductant injector, a plurality of predetermined parameters ($r_R$, $r_O$, $r_D$, $r_A$), and a predetermined look-up factor (K(T, F/V)) of a flow rate (F) of the exhaust gas entering the SCR device, a volume (V) and a temperature (T) of the SCR device.

The assembly may include an outlet NOx sensor in communication with the exhaust gas downstream of the SCR device. Obtaining the estimated parameter may include obtaining a measurement ($y_S$) of the outlet NOx concentration in the exhaust gas, via the outlet NOx sensor. An ammonia coverage ratio ($\theta$) and storage capacity ($\Theta$) is obtained based at least partially on the extended Kalman filter applied to the capacity aging model. The capacity aging model is based at least partially on the measurement ($y_S$) of the output NOx sensor, a catalyst NOx conversion efficiency ($\hat{\eta}$), a catalyst ammonia conversion efficiency ($\hat{\xi}$), with the capacity aging model being characterized as:

$$\frac{\theta(k+1) - \theta(k)}{dt} = -(r_O + r_D)\theta - r_R \theta(1-\hat{\eta})u_1 + r_A(1-\theta)(1-\hat{\xi})u_2$$

$$\Theta(k+1) - \Theta(k) = 0$$

$$y_S = y_1 + K(T, F/V)y_2$$

Obtaining the estimated parameter may include obtaining respective updated values of the catalyst NOx conversion efficiency ($\hat{\eta}$), the catalyst ammonia conversion efficiency ($\hat{\xi}$), the outlet NOx concentration ($y_1$) and the outlet ammonia concentration ($y_2$). The respective updated values are applied to the extended Kalman filter and the capacity aging model. The respective updated values are obtained as follows:

$$\hat{y}_1(k) = (1 - \hat{\eta}(k))u_1, \hat{\eta}(k) = \frac{r_R \hat{\Theta}\hat{\theta}}{(F/V) + r_R \hat{\Theta}\hat{\theta}},$$

$$\hat{\xi}(k) = 1 - \frac{\hat{y}_2}{u_2}, \hat{y}_2 = \frac{r_D \hat{\Theta}\hat{\theta} + (F/V)u_2}{(F/V) + r_A \hat{\Theta}(1-\hat{\theta})}$$

The controller may be configured to send an output of the extended Kalman filter and the capacity aging model to a model predictive control (MPC) module. The MPC module is employed to obtain an optimized value of inlet dose ($u_2$). The reductant injector is commanded to inject the optimized value of the inlet dose ($u_2$). Determining the catalyst status may include comparing a first integration of the outlet NOx concentration over time ($\int y_1 dt$) and a second integration of the threshold NOx concentration over time ($\int y_T dt$). If the first integration exceeds the second integration, then a diagnostic signal may be generated by the controller ($\int y_1 dt > \int y_T dt$).

Determining the catalyst status may include comparing the estimated storage capacity ($\Theta$) and the threshold storage capacity ($\Theta_T$). If the estimated storage capacity ($\Theta$) falls below the threshold storage capacity ($\Theta_T$), then a diagnostic signal may be generated by the controller ($\Theta < \Theta_T$). The controller may be configured to set a first flag as true if the first integration exceeds the second integration, and set a second flag as true if the estimated storage capacity ($\Theta$) falls below the threshold storage capacity ($\Theta_T$). If at least one of the first flag and the second flag is true, then the controller may be configured to generate a diagnostic report. If both of the first and the second flags are true, then the controller may be configured to command the engine to reduce production of the exhaust gas.

The above features and advantages and other features and advantages of the present disclosure are readily apparent from the following detailed description of the best modes for carrying out the disclosure when taken in connection with the accompanying drawings.

DETAILED DESCRIPTION

Figure 1:
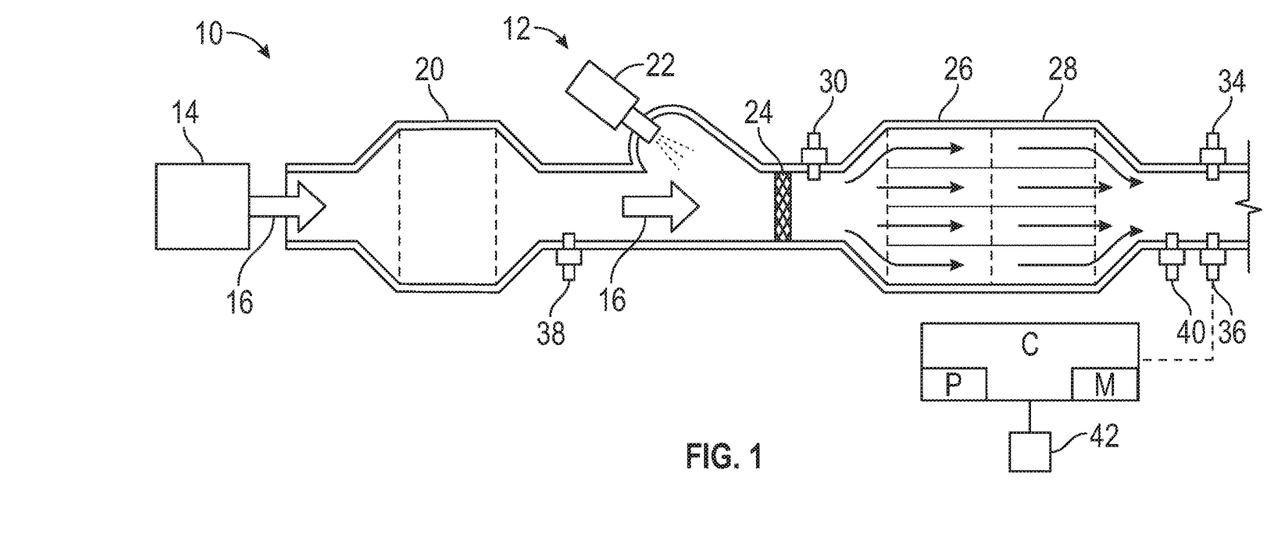
FIG. 1 is a schematic fragmentary view of an aftertreatment assembly having a controller.

Referring to the drawings, wherein like reference numbers refer to like components, FIG. 1 schematically illustrates an aftertreatment assembly 12, which may be part of a device 10. The device 10 may be a mobile platform, such as, but not limited to a, standard passenger car, sport utility vehicle, light truck, heavy duty vehicle, ATV, minivan, bus, transit vehicle, bicycle, robot, farm implement, sports-related equipment, boat, plane, train or other transportation device. The device 10 may take many different forms and include multiple and/or alternate components and facilities.

The device 10 includes an internal combustion engine 14, referred to herein as engine 14. The engine 14 is configured to combust an air-fuel mixture in order to generate output torque and may include a spark-ignition engine, a compression-ignition engine, a piston-driven engine or other type of engine available to those skilled in the art. The combustion of the air-fuel mixture produces an exhaust gas 16, which is expelled from the engine 14 to the aftertreatment assembly 12. The assembly 12 may include an oxidation catalyst 20, which is configured to convert nitrogen monoxide, a NOx form not easily treated in a selective catalytic reduction (SCR) device, into nitrogen dioxide, a NOx form easily treated in a selective catalytic reduction (SCR) device.

Referring to FIG. 1, a reductant injector 22 injects a reductant, such as urea, into the stream of exhaust gas 16. The reductant may be directly sprayed into the stream of the exhaust gas 16. A mixer device 24 may be employed for providing a substantially even distribution. The assembly 12 includes a selective catalytic reduction (SCR) device 26 having a catalyst and configured to receive the exhaust gas 16. The SCR device 26 is configured to utilize constituents of the injected reductant to convert NOx to other constituents, as understood by those skilled in the art.

Referring to FIG. 1, an inlet NOx sensor 30 and an outlet NOx sensor 34 are configured to detect and quantify the NOx concentration in the flow of exhaust gas 16 entering and exiting SCR device 26, respectively. An outlet ammonia sensor 36 is configured to detect and quantify the ammonia concentration in the exhaust gas flow exiting SCR device 26. A first temperature sensor 38 and a second temperature sensor 40 are configured to detect temperature of the exhaust gas 16 entering and exiting the SCR device 26, respectively. It should be noted that the NOx concentration and the ammonia concentration in the exhaust gas 16 and other parameters described below may be quantified in other ways, including via "virtual sensing" and modeling based on other measurements and using sensors at other locations. For example, a virtual NOx sensor modeling engine output and conditions within the exhaust gas flow may be employed to estimate the NOx concentration entering the SCR device 26. The gas or substrate temperature inside the SCT catalyst can be estimated based on a measurement of SCR inlet and outlet temperatures 38 and 40 and ambient temperature.

Referring to FIG. 1, the assembly 12 includes a controller C operatively connected to or in electronic communication with the engine 14. Referring to FIG. 1, the controller C includes at least one processor P and at least one memory M (or any non-transitory, tangible computer readable storage medium) on which are recorded instructions for executing method 100 for model-based monitoring of the SCR device 26, shown in FIG. 2 and described below. The method 100 relies on a number of models, including a catalyst degradation model, which is developed and calibrated to a real SCR device 26. The memory M can store controller-executable instruction sets, and the processor P can execute the controller-executable instruction sets stored in the memory M.

Figure 2:
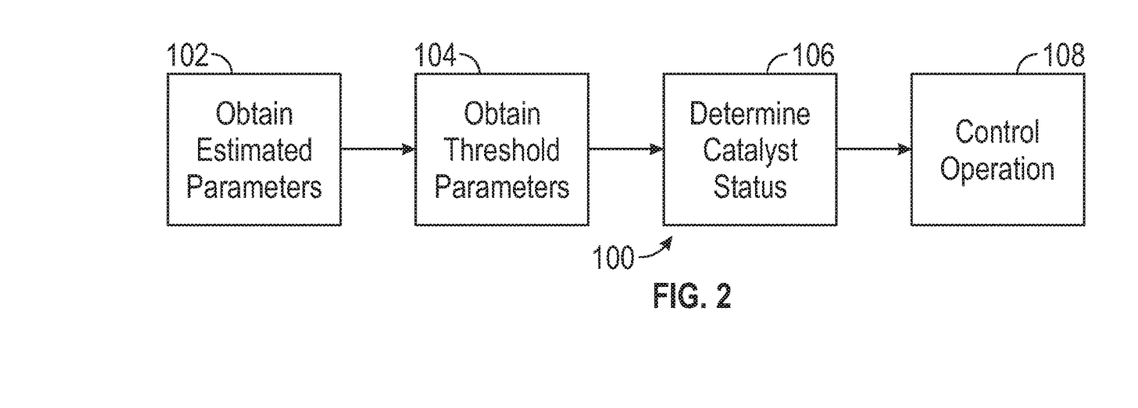
FIG. 2 is a flowchart for a method executable by the controller of FIG. 1.

Referring now to FIG. 2, a flowchart of the method 100 stored on and executable by the controller C of FIG. 1 is shown. The method 100 is also illustrated with respect to four embodiments. The controller C of FIG. 1 is specifically programmed to execute the steps of the method 100. The method 100 need not be applied in the specific order recited herein. Furthermore, it is to be understood that some steps may be eliminated.

Referring to FIG. 2, method 100 may begin with block 102, where the controller C is programmed or configured to obtain at least one estimated parameter, including obtaining an estimated nitrogen oxide (NOx) concentration in the exhaust gas 16 exiting the SCR device 26. In block 104 of FIG. 2, the controller C is programmed to obtain at least one threshold parameter based at least partially on a catalyst degradation model, including obtaining a threshold NOx concentration ($y_T$) in the exhaust gas exiting the SCR device.

The catalyst degradation model is based at least partially on a predetermined threshold storage capacity ($\Theta_T$). The threshold storage capacity ($\Theta_T$) may be based on various statutory requirements. To determine the threshold storage capacity ($\Theta_T$), the maximum ammonia storage capability parameter of the SCR device 26 may be reduced until its simulated NOx output (under standard urea injection control) exceeds about 1.5 times (or another factor based) of the nominal NOx output from a nominal SCR plant model or test:

$$\left.\frac{\int NOx\_outlet(t, \Theta_T)dt}{\int NOx\_outlet(t, \Theta_{nominal})dt}\right|_{FTP} = 1.5$$

The calibration may be derived from simulation during a United States Federal Test Procedure (FTP). The calibrated threshold storage capacity ($\Theta_T$) may be based on OBD (no board diagnostics), stored in the controller C and run in parallel with the physical SCR device 26. As a non-limiting example, the following values may be employed in one embodiment: $\Theta_{nominal}=0.4298$, $\Theta_T=0.137$.

The catalyst degradation model is based at least partially on NOx mass flow balance and ammonia (NH3) mass flow balance through the SCR catalyst. The catalyst degradation model is based at least partially on respective rates of change over time (t) of an outlet NOx concentration ($y_1$) of the exhaust gas exiting the SCR device, an ammonia coverage ratio ($\theta$), and an outlet ammonia concentration ($y_2$), respectively designated as $dy_1/dt$, $d\theta/dt$ and $dy_2/dt$, and calculated as:

$$\frac{dy_1}{dt} = \frac{1}{V}(Fu_1 - Fy_1 - r_R y_1 \Theta_T \theta)$$

$$\frac{d\theta}{dt} = \frac{r_A y_2}{FM_{WNH_3}}(1-\theta) - r_D \theta - \frac{r_R y_1}{FM_{WNO_x}}\theta - r_O \theta$$

$$\frac{dy_2}{dt} = \frac{1}{V}(Fu_2 - Fy_2 - r_A \Theta_T y_2 (1-\theta) + r_D FM_{WNH_3} \Theta_T \theta)$$

In one embodiment, the catalyst degradation model is represented as:

$$0 = \frac{1}{V}(Fu_1 - Fy_1 - r_R y_1 \Theta_T \theta)$$

$$\frac{d\theta}{dt} = \frac{r_A y_2}{FM_{WNH_3}}(1-\theta) - r_D \theta - \frac{r_R y_1}{FM_{WNO_x}}\theta - r_O \theta$$

$$0 = \frac{1}{V}(Fu_2 - Fy_2 - r_A \Theta_T y_2 (1-\theta) + r_D FM_{WNH_3} \Theta_T \theta)$$

As shown above, the catalyst degradation model is based at least partially on an inlet NOx concentration ($u_1$) in the exhaust gas 16 entering the SCR device 26, an inlet dose ($u_2$) injected by the reductant injector 22, an outlet NOx concentration ($y_1$) of the exhaust gas exiting the SCR device, and an outlet ammonia concentration ($y_2$),—a plurality of predetermined chemical reaction parameters as a function of catalyst temperature ($r_R$, $r_O$, $r_D$, $r_A$, $M_{WNH3}$ and $M_{WNOx}$), a flow rate (F) of the exhaust gas 16 received at the SCR device 26 and a volume (V) of the SCR device 26. Here $r_R$ is a NOx reduction rate, $r_O$ is an ammonia oxidation rate, $r_A$ is an adsorption rate, $r_D$ is a desorption rate, each obtained by calibration in a test cell or laboratory conditions and stored in a look-up table. The predetermined parameters ($r_R$, $r_O$, $r_D$, $r_A$) are proportional to an exponent of (−E/RT), where T is a catalyst temperature, R is a gas constant and E is an activation energy of reduction, oxidation, desorption and adsorption, respectively. Additionally, $M_{WNH3}$ and $M_{WNOx}$ are molecular weights of the NOx and the ammonia in the exhaust gas 16 received at the SCR device 26.

In block 106 of FIG. 2, the controller C is programmed to determine a catalyst status based on a comparison of the estimated parameter(s) determined in block 102 and the threshold parameter(s) determined in block 104. In block 108 of FIG. 2, the controller C is programmed to control operation of the assembly 12 based at least partially on the catalyst status.

Figure 3:
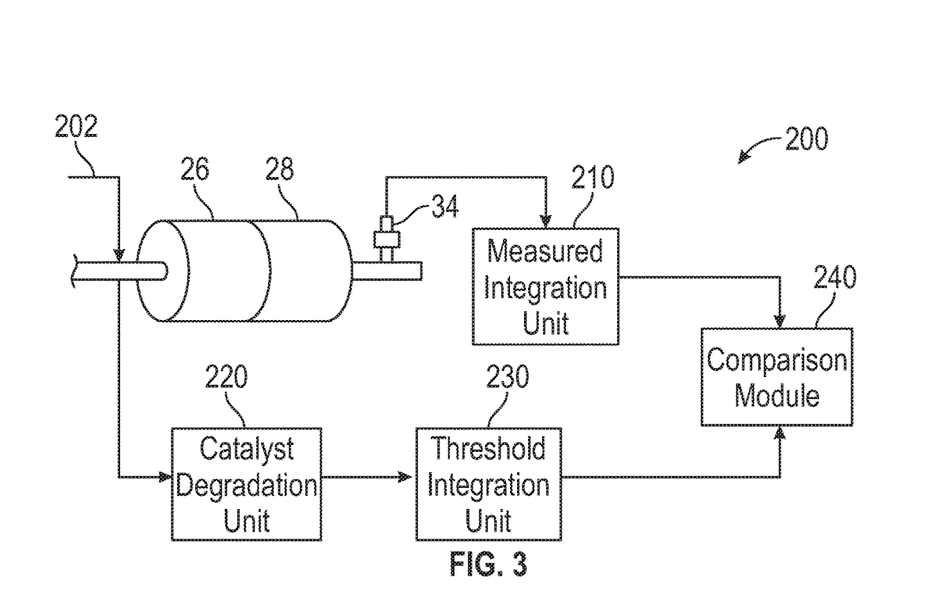
FIG. 3 is a schematic diagram of a control structure embodying the method of FIG. 2, in accordance with a first embodiment.
Figure 4:
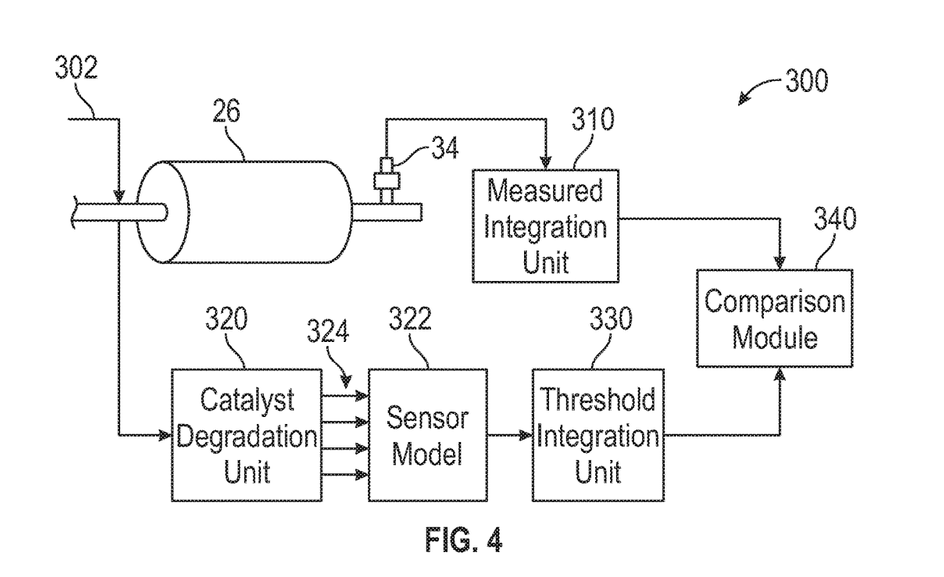
FIG. 4 is a schematic diagram of a control structure embodying the method of FIG. 2, in accordance with a second embodiment.
Figure 5:
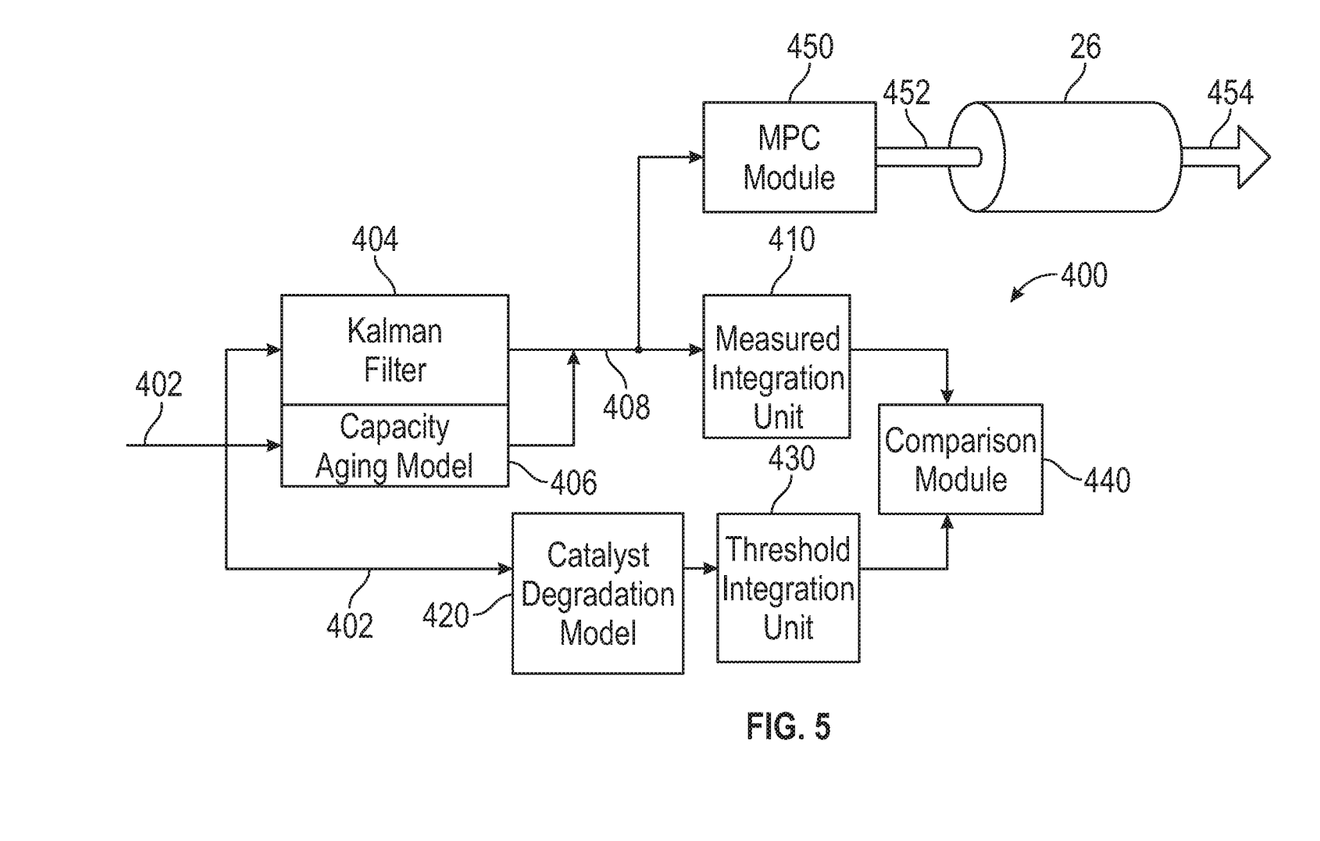
FIG. 5 is a schematic diagram of a control structure embodying the method of FIG. 2, in accordance with a third embodiment.

The method 100 is now illustrated with three embodiments described below. FIG. 3 is a schematic diagram of a first control structure 200 having various modules or units embodying the method 100, in accordance with a first embodiment. FIGS. 4 and 5 illustrate a second and third control structure 300, 400, respectively, embodying the method 100. The various modules or units of the first, second and third control structures 200, 300 and 400 may be embedded as part of the controller C.

The embodiment in FIG. 3 includes a rear oxidation catalytic device 28 positioned downstream of the SCR device 26 and configured to eliminate ammonia slip from SCR catalyst, thus minimizing cross-contamination of ammonia in the measurements of the outlet NOx sensor 34 as well. The inlet parameters 202 (including the inlet NOx concentration ($u_1$) in the exhaust gas 16 entering the SCR device 26 and the inlet dose ($u_2$) injected by the reductant injector 22) are input into the Catalyst Degradation Unit 220 containing the degradation catalyst model with threshold storage capacity ($\Theta_T$), to obtain the rates of change over time (t) of an outlet NOx concentration ($y_1$) of the exhaust gas exiting the SCR device, an ammonia coverage ratio ($\theta$), and an outlet ammonia concentration ($y_2$), respectively designated as $y_1$, $d\theta/dt$ and $y_2$ $y_2$, and described previously.

Referring to FIG. 3, the first control structure 200 includes a Measured Integration Unit 210 configured to integrate the current measured outlet NOx concentration over time ($\int y_1 dt$). A Threshold Integration Unit 230 is configured to obtain a second integration of the threshold NOx concentration predicted from the Catalyst Degradation Unit 220 over time ($\int y_T dt$). The Comparison Module 240 is configured to compare the outputs of the Measured Integration Unit 210 and the Threshold Integration Unit 230, per block 106 of FIG. 2.

FIG. 4 is a schematic diagram of a second control structure 300 embodying the method 100. The inlet parameters 302 (including the inlet NOx concentration ($u_1$) in the exhaust gas 16 entering the SCR device 26 and the inlet dose ($u_2$) injected by the reductant injector 22) are input into the Catalyst Degradation Unit 320, to obtain the rates of change over time (t) of an predicted outlet NOx concentration ($y_{T1}$) from the degradation catalyst model, an ammonia coverage ratio ($\theta$), and a predicted outlet ammonia concentration ($y_{T2}$).

The embodiment in FIG. 4 does not include a rear oxidation catalytic device positioned downstream of the SCR device 26. Cross-contamination of ammonia in the measurements of the outlet NOx sensor 34 is accommodated by feeding the model outputs and parameters 324 obtained from the Catalyst Degradation Unit 320 into a NOx Sensor Model 322. The model parameters 324 include a predetermined look-up factor (K) which is stored as a function of a flow rate (F) of the exhaust gas 16 entering the SCR device 26, a volume (V) and a temperature (T) of the SCR device 26. The Sensor Model 322 predicts the measurement ($y_S$) of the output NOx sensor 34 with the modeled outlet NOx concentration ($y_{T1}$), outlet ammonia concentration ($y_{T2}$) and the model parameters 324. The Sensor Model 322 may be characterized as:

$$y_S = y_{T1} + K(T, F/V) y_{T2}$$

Referring to FIG. 4, the second control structure 300 includes a Measured Integration Unit 310 configured to obtain a first integration of the measured outlet NOx concentration by the NOx sensor affected by cross-sensitivity of NH3 presence over time ($\int y_1 dt$). A Threshold Integration Unit 330 is configured to obtain a second integration of the threshold NOx concentration from the NOx Sensor Model 322 over time ($\int y_s dt$). The Comparison Module 340 is configured to compare the outputs of the Measured Integration Unit 310 and the Threshold Integration Unit 330, per block 106 of FIG. 2.

FIG. 5 is a schematic diagram of a third control structure 400 embodying the method 100. The inlet parameters 402 may be input into a Catalyst Degradation Unit 420, as described previously, with the results subsequently fed into the Threshold Integration Unit 430, as in the first and second embodiments.

In the embodiment shown in FIG. 5, obtaining the estimated parameter in block 102 includes obtaining an estimated storage capacity ($\Theta$) of the catalyst based at least partially on a Kalman Filter Module 404 and a Capacity Aging Model Unit 406. The inlet parameters 402 (including the inlet NOx concentration ($u_1$) in the exhaust gas 16 entering the SCR device 26 and the inlet dose ($u_2$) injected by the reductant injector 22) are input into a Kalman Filter Module 404 and a Capacity Aging Model Unit 406. The Kalman Filter Module 404 is constructed to estimate the current storage capacity ($\Theta$) of the SCR catalyst as an indication to estimate or monitor catalyst aging. When $\Theta$ is aged and its estimation reduced in size to OBD threshold $\Theta_T$ (i.e. $\Theta < \Theta_T$), a malfunction of the catalyst is detected. The capacity aging model stored in the Capacity Aging Model Unit 406 is characterized as follows:

$$\frac{\theta(k+1) - \theta(k)}{dt} = -(r_O + r_D)\theta - r_R\theta(1-\hat{\eta})u_1 + r_A(1-\theta)(1-\hat{\xi})u_2$$

$$\Theta(k+1) - \Theta(k) = 0$$

$$y_S = \hat{y}_1 + K(T, F/V)\hat{y}_2$$

The first equation above describes the ammonia coverage ratio ($\theta$), which is based at least partially on a sampling or sample time (k), an estimated catalyst NOx conversion efficiency ($\hat{\eta}$) updated at the sample time k, an estimated catalyst ammonia conversion efficiency ($\hat{\xi}$) updated at sample time k, the estimated outlet NOx concentration ($y_1$), an outlet ammonia concentration ($y_2$), the inlet NOx concentration ($u_1$) of the exhaust gas 16 entering the SCR device 26, the inlet dose ($u_2$) injected by the reductant injector 22 and a plurality of predetermined parameters ($r_R, r_O, r_D, r_A$). Here $r_R$ is a NOx reduction rate, $r_O$ is a NOx oxidation rate, $r_A$ is an adsorption rate, $r_D$ is a desorption rate, each obtained by calibration in a test cell or laboratory conditions and stored in a look-up table.

The second equation above describes the change in maximum ammonia storage capacity ($\Theta$), assuming the storage capacity changes very slowly in a catalyst lifespan, such that $\Theta$ is considered as a constant between the sample time at (k+1) and k. The third equation above relates the measurement ($y_S$) of the output NOx sensor 34 with the modeled outlet NOx concentration ($y_1$), outlet ammonia concentration ($y_2$), and a predetermined look-up factor (K(T, F/V)) of a flow rate (F) of the exhaust gas 16 entering the SCR device 26, a volume (V) and a temperature (T) of the SCR device 26. In the embodiment shown in FIG. 5, a measurement ($y_S$) of the outlet NOx concentration in the exhaust gas 16 is obtained via the outlet NOx sensor 34, positioned downstream of the SCR device 26.

Based on these three equations, the Kalman Filter Module 404 (storing a designed linear time-varying extended Kalman filter available to those skilled in the art) is applied to estimate the ammonia coverage ratio ($\theta$) and the estimated storage capacity ($\Theta$) at the sample time (k+1). Furthermore, respective updated values of the catalyst NOx conversion efficiency ($\hat{\eta}$), the catalyst ammonia conversion efficiency ($\hat{\xi}$), the outlet NOx concentration ($\hat{y}_1$) and the outlet ammonia concentration ($\hat{y}_2$) may be obtained as follows from the previously estimated ammonia coverage ratio ($\theta(k)$) and the estimated storage capacity ($\Theta(k)$) at the sample time (k):

$$\hat{y}_1(k) = (1 - \hat{\eta}(k))u_1, \hat{\eta}(k) = \frac{r_R \hat{\Theta}\hat{\theta}}{(F/V) + r_R\hat{\Theta}\hat{\theta}},$$

$$\hat{\xi}(k) = 1 - \frac{\hat{y}_2}{u_2}, \hat{y}_2 = \frac{r_D\hat{\Theta}\hat{\theta} + (F/V)u_2}{(F/V) + r_A\hat{\Theta}(1-\hat{\theta})}$$

The respective updated values may be used to update the Capacity Aging Model Unit 406. The Kalman Filter Module 404 is executed again to estimate $\theta$ and $\Theta$. The controller C may be configured to send the output parameters 408 of the Kalman Filter Module 404 and the Capacity Aging Model 406 to a model predictive control (MPC) module 450. The MPC module 450 is employed to obtain an optimized value 452 of inlet dose ($u_2$) adjusted based on the current estimated ammonia coverage ratio $\theta$ and storage capacity $\Theta$. The reductant injector 22 of FIG. 1 is commanded to inject the optimized value 452 (obtained from the MPC Module 450) of the inlet dose ($u_2$).

The capacity aging model stored in the Capacity Aging Model Unit 406 may be extended to a general format as follows:

$$\frac{\theta(k+1) - \theta(k)}{dt} = f(\theta, u_1, u_2, T, F, \Theta)$$

$$\frac{\Theta(k+1) - \Theta(k)}{dt} = 0$$

$$y_s = g(\theta, u_1, u_2, T, F, \Theta)$$

As noted above per block 106 of FIG. 2, the controller C is programmed to determine a catalyst status based on a comparison of the estimated and the threshold parameter(s). In block 108 of FIG. 2, the controller C is programmed to control operation of the assembly 12 based at least partially on the catalyst status. Determining the catalyst status may include comparing the first integration of the outlet NOx concentration over time (from the Measured Integration Units 210, 310, 410 of FIGS. 3-5) and the second integration of the threshold NOx concentration over time (from the Threshold Integration Units 230, 330, 430 of FIGS. 3-5). If the first integration exceeds the second integration, then a diagnostic signal may be generated by the controller C ($\int y_1 dt > \int y_T dt$).

In the embodiment of FIG. 5, determining the catalyst status per block 106 includes comparing the estimated storage capacity ($\Theta$) and the threshold storage capacity ($\Theta_T$). If the estimated storage capacity ($\Theta$) falls below the threshold storage capacity ($\Theta_T$), then a diagnostic signal may be generated by the controller C ($\Theta<\Theta_T$). The diagnostic signal may be in a number of formats. For example, the diagnostic signal may include indicating a message on a display 42 of the device 10. For example, the diagnostic signal may include illuminating a "check engine" light on the display 42. The diagnostic signal may include a diagnostic report sent to a fleet manager of the device 10.

The controller C may be configured to set a first flag as true if the first integration exceeds the second integration, and set a second flag as true if the estimated storage capacity ($\Theta$) falls below the threshold storage capacity ($\Theta_T$). If at least one of the first flag and the second flag is true, controller C may be configured to generate a diagnostic report. If both of the first and the second flags are true, controller C may be configured to command the engine 14 to reduce production of the exhaust gas 16, for example, by shifting to a predefined operating mode with reduced speed.

In summary, the method 100 provides an efficient way to monitor and control the assembly 12. In one embodiment, the threshold storage capacity ($\Theta_T$) is set to the point where the emission from the SCR device 26 increases to 1.5 times the nominal rate. The calibrated maximum storage capability parameter may be stored in the controller C and run in parallel with the physical SCR device 26. The estimated NOx and ammonia concentration exiting the SCR device 26 are compared with the threshold NOx and NH3 ammonia concentration simulated with the catalyst degradation model.

The controller C of FIG. 1 may be an integral portion of, or a separate module operatively connected to, other controllers of the device 10, such as the engine controller. The controller C includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An aftertreatment assembly comprising:
 a selective catalytic reduction (SCR) device having a catalyst and configured to receive an exhaust gas;
 a controller operatively connected to the SCR device, the controller having a processor and a tangible, non-transitory memory on which is recorded instructions for executing a method of model-based monitoring of the SCR device;
 wherein execution of the instructions by the processor causes the controller to:
  obtain at least one estimated parameter, including obtaining an outlet nitrogen oxide (NOx) concentration ($y_1$) in the exhaust gas exiting the SCR device;
  obtain at least one threshold parameter based at least partially on a catalyst degradation model, including obtaining a threshold NOx concentration ($y_T$) in the exhaust gas exiting the SCR device, the catalyst degradation model being based at least partially on a predetermined threshold storage capacity ($\Theta_T$);
  determine a catalyst status based on a comparison of the at least one estimated parameter and the at least one threshold parameter; and
  control operation of the assembly based at least partially on the catalyst status; and
 wherein determining the catalyst status includes:
  comparing a first integration of the outlet NOx concentration over time ($\int y_1 dt$) and a second integration of the threshold NOx concentration over time ($\int y_T dt$); and
  if the first integration exceeds the second integration ($\int y_1 dt > \int y_T dt$), then generating a diagnostic signal, via the controller.

2. The assembly of claim 1, wherein the catalyst degradation model is based at least partially on:
 an inlet NOx concentration ($u_1$) in the exhaust gas entering the SCR device, an inlet dose ($u_2$) injected by the reductant injector, a plurality of predetermined parameters ($r_R$, $r_O$, $r_D$, $r_A$, $M_{WNH3}$ and $M_{WNOx}$), a flow rate (F) of the exhaust gas received at the SCR device and a volume (V) of the SCR device.

3. The assembly of claim 2, wherein the catalyst degradation model is based at least partially on:

respective rates of change over time (t) of the outlet NOx concentration ($y_1$) of the exhaust gas exiting the SCR device, an ammonia coverage ratio ($\theta$), and an outlet ammonia concentration ($y_2$), respectively designated as $dy_1/dt$, $d\theta/dt$ and $dy_2/dt$, and calculated as:

$$\frac{dy_1}{dt} = \frac{1}{V}(Fu_1 - Fy_1 - r_R y_1 \Theta_T \theta)$$

$$\frac{d\theta}{dt} = \frac{r_A y_2}{FM_{WNH_3}}(1-\theta) - r_D \theta - \frac{r_R y_1}{FM_{WNO_x}}\theta - r_O \theta$$

$$\frac{dy_2}{dt} = \frac{1}{V}(Fu_2 - Fy_2 - r_A \Theta_T y_2 (1-\theta) + r_D FM_{WNH_3} \Theta_T \theta).$$

4. The assembly of claim 1, wherein obtaining the at least one estimated parameter includes:
obtaining an estimated storage capacity ($\Theta$) of the catalyst based at least partially on an extended Kalman filter and a capacity aging model; and
wherein the capacity aging model is based at least partially on a sample time (k), the outlet NOx concentration ($y_1$) of the exhaust gas exiting the SCR device, an outlet ammonia concentration ($y_2$), an inlet NOx concentration ($u_1$) of the exhaust gas entering the SCR device, an inlet dose ($u_2$) injected by the reductant injector, a plurality of predetermined parameters ($r_R$, $r_O$, $r_D$, $r_A$), and a predetermined look-up factor ($K(T, F/V)$) of a flow rate (F) of the exhaust gas entering the SCR device, a volume (V) and a temperature (T) of the SCR device.

5. The assembly of claim 4, wherein the assembly includes an outlet NOx sensor in communication with the exhaust gas downstream of the SCR device, and wherein obtaining the at least one estimated parameter includes:
obtaining a measurement ($y_S$) via the outlet NOx sensor;
obtaining an ammonia coverage ratio ($\theta$) based at least partially on the extended Kalman filter and the capacity aging model; and
wherein the capacity aging model is based at least partially on the measurement ($y_S$) of the output NOx sensor, a catalyst NOx conversion efficiency ($\hat{\eta}$), a catalyst ammonia conversion efficiency ($\hat{\xi}$), the capacity aging model being characterized as:

$$\frac{\theta(k+1) - \theta(k)}{dt} = -(r_O + r_D)\theta - r_R \theta(1-\hat{\eta})u_1 + r_A(1-\theta)(1-\hat{\xi})u_2$$

$$\Theta(k+1) - \Theta(k) = 0$$

$$y_S = y_1 + K(T, F/V)y_2.$$

6. The assembly of claim 5, wherein obtaining the at least one estimated parameter includes:
obtaining respective updated values of the catalyst NOx conversion efficiency ($\hat{\eta}$), the catalyst ammonia conversion efficiency ($\hat{\xi}$), the outlet NOx concentration ($y_1$), the outlet ammonia concentration ($y_2$);
applying the respective updated values to the extended Kalman filter and the capacity aging model; and
wherein the respective updated values are obtained as:

$$\hat{y}_1(k) = (1-\hat{\eta}(k))u_1, \hat{\eta}(k) = \frac{r_R \hat{\Theta}\hat{\theta}}{(F/V) + r_R \hat{\Theta}\hat{\theta}},$$

$$\hat{\xi}(k) = 1 - \frac{\hat{y}_2}{u_2}, \hat{y}_2 = \frac{r_D \hat{\Theta}\hat{\theta} + (F/V)u_2}{(F/V) + r_A \hat{\Theta}(1-\hat{\theta})}.$$

7. The assembly of claim 5, wherein the controller is configured to:
send an output of the extended Kalman filter and the capacity aging model to a model predictive control (MPC) module;
employ the MPC module to obtain an optimized value of inlet dose ($u_2$); and
command the reductant injector to inject the optimized value of the inlet dose ($u_2$).

8. The assembly of claim 5, wherein determining the catalyst status includes:
comparing the estimated storage capacity ($\Theta$) and the threshold storage capacity ($\Theta_T$); and
if the estimated storage capacity ($\Theta$) falls below the threshold storage capacity ($\Theta_T$), then generating a diagnostic signal, via the controller ($\Theta<\Theta_T$).

9. A method for controlling operation of an aftertreatment assembly, the assembly including a selective catalytic reduction (SCR) device having a catalyst and configured to receive an exhaust gas, a reductant injector and a controller having a processor and a tangible, non-transitory memory, the method comprising:
obtaining at least one estimated parameter, including obtaining an outlet nitrogen oxide (NOx) concentration ($y_1$) in the exhaust gas exiting the SCR device, via the controller;
obtaining at least one threshold parameter based at least partially on a catalyst degradation model, including obtaining a threshold NOx concentration ($y_T$) in the exhaust gas exiting the SCR device, via the controller;
wherein the catalyst degradation model is based at least partially on a predetermined threshold storage capacity ($\Theta_T$);
determining a catalyst status based on a comparison of the at least one estimated parameter and the at least one threshold parameter, including comparing a first integration of the outlet NOx concentration over time ($\int y_1 dt$) and a second integration of the threshold NOx concentration over time ($\int y_T dt$), and if the first integration exceeds the second integration ($\int y_1 dt > \int y_T dt$), then generating a diagnostic signal, via the controller; and
controlling operation of the assembly based at least partially on the catalyst status, via the controller.

10. The method of claim 9, wherein the catalyst degradation model is based at least partially on:
an inlet NOx concentration ($u_1$) in the exhaust gas entering the SCR device, an inlet dose ($u_2$) injected by the reductant injector, a plurality of predetermined parameters ($r_R$, $r_O$, $r_D$, $r_A$, $M_{WNH3}$ and $M_{WNOx}$), a flow rate (F) of the exhaust gas received at the SCR device and a volume (V) of the SCR device.

11. The method of claim 10, wherein the catalyst degradation model is based at least partially on:
respective rates of change over time (t) of the outlet NOx concentration ($y_1$) of the exhaust gas exiting the SCR device, an ammonia coverage ratio ($\theta$), and an outlet ammonia concentration ($y_2$), respectively designated as $dy_1/dt$, $d\theta/dt$ and $dy_2/dt$, and calculated as:

$$\frac{dy_1}{dt} = \frac{1}{V}(Fu_1 - Fy_1 - r_R y_1 \Theta_T \theta)$$

-continued $$\frac{d\theta}{dt} = \frac{r_A y_2}{FM_{WNH_3}}(1-\theta) - r_D\theta - \frac{r_R y_1}{FM_{WNO_x}}\theta - r_O\theta$$

$$\frac{dy_2}{dt} = \frac{1}{V}(Fu_2 - Fy_2 - r_A\Theta_T y_2(1-\theta) + r_D FM_{WNH_3}\Theta_T\theta).$$

12. The method of claim 10, wherein the catalyst degradation model is based at least partially on:
a rate of change over time (t) of an ammonia coverage ratio (θ), the outlet NOx concentration ($y_1$) of the exhaust gas exiting the SCR device and an outlet ammonia concentration ($y_2$), calculated as:

$$0 = \frac{1}{V}(Fu_1 - Fy_1 - r_R y_1\Theta_T\theta)$$

$$\frac{d\theta}{dt} = \frac{r_A y_2}{FM_{WNH_3}}(1-\theta) - r_D\theta - \frac{r_R y_1}{FM_{WNO_x}}\theta - r_O\theta$$

$$0 = \frac{1}{V}(Fu_2 - Fy_2 - r_A\Theta_T y_2(1-\theta) + r_D FM_{WNH_3}\Theta_T\theta).$$

13. The method of claim 9, wherein obtaining the at least one estimated parameter includes:
obtaining an estimated storage capacity (Θ) of the catalyst based at least partially on an extended Kalman filter and a capacity aging model; and
wherein the capacity aging model is based at least partially on a sample time (k), the outlet NOx concentration ($y_1$) of the exhaust gas exiting the SCR device, an outlet ammonia concentration ($y_2$), an inlet NOx concentration ($u_1$) of the exhaust gas entering the SCR device, an inlet dose ($u_2$) injected by the reductant injector, a plurality of predetermined parameters ($r_R$, $r_O$, $r_D$, $r_A$), and a predetermined look-up factor (K(T, F/V)) of a flow rate (F) of the exhaust gas entering the SCR device, a volume (V) and a temperature (T) of the SCR device.

14. The method of claim 13, wherein the assembly includes an outlet NOx sensor in communication with the exhaust gas downstream of the SCR device, and wherein obtaining the at least one estimated parameter includes:
obtaining a measurement ($y_S$) via the outlet NOx sensor;
obtaining an ammonia coverage ratio (θ) and the ammonia storage capacity (Θ) based at least partially on the extended Kalman filter applied to the capacity aging model; and
wherein the capacity aging model is based at least partially on the measurement ($y_S$) of the output NOx sensor, a catalyst NOx conversion efficiency ($\hat{\eta}$), a catalyst ammonia conversion efficiency ($\hat{\xi}$), the capacity aging model being characterized as:

$$\frac{\theta(k+1) - \theta(k)}{dt} = -(r_O + r_D)\theta - r_R\theta(1-\hat{\eta})u_1 + r_A(1-\theta)(1-\hat{\xi})u_2$$

$$\Theta(k+1) - \Theta(k) = 0$$

$$y_S = y_1 + K(T, F/V)y_2.$$

15. The method of claim 14, wherein obtaining the at least one estimated parameter includes:
obtaining respective updated values of the catalyst NOx conversion efficiency ($\hat{\eta}$), the catalyst ammonia conversion efficiency ($\hat{\xi}$), the outlet NOx concentration ($y_1$), the outlet ammonia concentration ($y_2$);
applying the respective updated values to the extended Kalman filter and the capacity aging model; and
wherein the respective updated values are obtained as:

$$\hat{y}_1(k) = (1 - \hat{\eta}(k))u_1, \hat{\eta}(k) = \frac{r_R\hat{\Theta}\hat{\theta}}{(F/V) + r_R\hat{\Theta}\hat{\theta}},$$

$$\hat{\xi}(k) = 1 - \frac{\hat{y}_2}{u_2}, \hat{y}_2 = \frac{r_D\hat{\Theta}\hat{\theta} + (F/V)u_2}{(F/V) + r_A\hat{\Theta}(1-\hat{\theta})}.$$

16. The method of claim 14, further comprising:
sending an output of the extended Kalman filter and the capacity aging model to a model predictive control (MPC) module;
employing the MPC module to obtain an optimized value of inlet dose ($u_2$); and
commanding the reductant injector to inject the optimized value of the inlet dose ($u_2$).

17. The method of claim 14, wherein determining the catalyst status includes:
comparing the estimated storage capacity (Θ) and the threshold storage capacity ($\Theta_T$); and
if the estimated storage capacity (Θ) falls below the threshold storage capacity ($\Theta_T$), then generating a diagnostic signal, via the controller (Θ<$\Theta_T$).

18. The method of claim 14, wherein the exhaust gas is produced by an engine operatively connected to the aftertreatment assembly and further comprising:
setting a first flag as true if the first integration exceeds the second integration, via the controller;
comparing the estimated storage capacity (Θ) and the threshold storage capacity ($\Theta_T$) and setting a second flag as true if the estimated storage capacity (Θ) falls below the threshold storage capacity ($\Theta_T$), via the controller;
if at least one of the first flag and the second flag is true, then generating a diagnostic report, via the controller; and
if both of the first and the second flags are true, then commanding the engine to reduce production of the exhaust gas, via the controller.

19. An aftertreatment assembly comprising:
a selective catalytic reduction (SCR) device having a catalyst and configured to receive an exhaust gas;
a controller operatively connected to the SCR device, the controller having a processor and a tangible, non-transitory memory on which is recorded instructions for executing a method of model-based monitoring of the SCR device;
wherein execution of the instructions by the processor causes the controller to:
obtain at least one estimated parameter, including obtaining an outlet nitrogen oxide (NOx) concentration ($y_1$) in the exhaust gas exiting the SCR device;
obtain at least one threshold parameter based at least partially on a catalyst degradation model, including obtaining a threshold NOx concentration ($y_T$) in the exhaust gas exiting the SCR device, the catalyst degradation model being based at least partially on a predetermined threshold storage capacity ($\Theta_T$);
determine a catalyst status based on a comparison of the at least one estimated parameter and the at least one threshold parameter; and control operation of the assembly based at least partially on the catalyst status;

wherein obtaining the at least one estimated parameter includes obtaining an estimated storage capacity ($\Theta$) of the catalyst based at least partially on an extended Kalman filter and a capacity aging model; and wherein the capacity aging model is based at least partially on a sample time (k), the outlet NOx concentration ($y_1$) of the exhaust gas exiting the SCR device, an outlet ammonia concentration ($y_2$), an inlet NOx concentration ($u_1$) of the exhaust gas entering the SCR device, an inlet dose ($u_2$) injected by the reductant injector, a plurality of predetermined parameters ($r_R$, $r_O$, $r_D$, $r_A$), and a predetermined look-up factor (K(T, F/V)) of a flow rate (F) of the exhaust gas entering the SCR device, a volume (V) and a temperature (T) of the SCR device.

20. The assembly of claim 19, wherein the catalyst degradation model is based at least partially on:

the inlet NOx concentration ($u_1$) in the exhaust gas entering the SCR device, the inlet dose ($u_2$) injected by the reductant injector, a plurality of predetermined parameters ($r_R$, $r_O$, $r_D$, $r_A$, $M_{WNH3}$ and $M_{WNOx}$), the flow rate (F) of the exhaust gas received at the SCR device and the volume (V) of the SCR device.

* * * * *